(12) United States Patent
Huang

(10) Patent No.: US 11,907,047 B2
(45) Date of Patent: Feb. 20, 2024

(54) DATA STORAGE DEVICE AND ERROR TOLERANCE SELECTING METHOD THEREOF

(71) Applicant: Silicon Motion, Inc., Jhubei (TW)

(72) Inventor: Sheng-Yuan Huang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 17/715,978

(22) Filed: Apr. 8, 2022

(65) Prior Publication Data

US 2023/0137772 A1    May 4, 2023

(30) Foreign Application Priority Data

Nov. 2, 2021 (TW) .................................. 110140661

(51) Int. Cl.
*G06F 11/07* (2006.01)
*G06F 3/06* (2006.01)

(52) U.S. Cl.
CPC .......... *G06F 11/0727* (2013.01); *G06F 3/064* (2013.01); *G06F 3/0619* (2013.01); *G06F 3/0659* (2013.01); *G06F 3/0673* (2013.01); *G06F 11/076* (2013.01); *G06F 11/0772* (2013.01)

(58) Field of Classification Search
CPC . G06F 11/0727; G06F 11/076; G06F 11/0772
See application file for complete search history.

(56) References Cited

U.S. PATENT DOCUMENTS

| | | | |
|---|---|---|---|
| 9,792,174 B2* | 10/2017 | Yurzola | G06F 11/1068 |
| 2015/0370632 A1* | 12/2015 | Yurzola | G11C 29/52 714/773 |
| 2016/0078966 A1* | 3/2016 | Li | G11C 16/349 714/723 |
| 2018/0046372 A1* | 2/2018 | Cai | G11C 16/0483 |

* cited by examiner

*Primary Examiner* — Jigar P Patel

(57) ABSTRACT

A data storage device, and an error tolerance selecting method thereof which includes: writing data to data blocks of the data storage device; reading written data of the data blocks as read data; comparing the read data and the written data of each data column in the data blocks, and calculating a number of error bits in each chunk including a plurality of data columns accordingly; calculating a difference value between the number of error bits in the chunk and a first threshold value to store the difference value in an error tolerance list; and selecting a largest difference value in the error tolerance list as an error tolerance.

12 Claims, 3 Drawing Sheets

DATA STORAGE DEVICE AND ERROR TOLERANCE SELECTING METHOD THEREOF

FIELD OF THE INVENTION

The present invention relates to an access technique for a data storage device, and more particularly to an error tolerance selecting method for the data storage device.

BACKGROUND OF THE INVENTION

Downgrade Flash all exists numerous bad data columns. When the bad data columns are not detected and removed, it will consume most error correction ability (such as, a number of correctable bits) of the error correction code of the data storage device, even may exceed error correction ability of error correction code, which will result in the storage capacity of the data storage device being reduced when a fireware is installed into the data storage device, and it is easy to cause the reading and writing failure of the data storage device. Wherein the number of bad data columns conflict with the error correction ability of error correction code. That is to say, when the number of bad data columns is more, the correctable correction ability of error correction code is less. Therefore, it is necessary to find out a balanceable selecting method of the error tolerance between the number of bad data columns and the error correction ability of error correction code.

SUMMARY OF THE INVENTION

The present invention, which provides a data storage device and an error tolerance selecting method thereof, can find a balance between the number of bad data columns and the error correction ability of error correction code, in order to find out the number of bad data columns under the maximum error correction ability of error correction code.

The present invention provides an error tolerance selecting method, applied to a data storage device, wherein the data storage device comprises a control unit and a data storage medium, and the data storage medium comprises a plurality of data blocks, each data block comprises a plurality of data columns, and the plurality of data columns are divided into a plurality of chunks. The control unit is configured to execute the error tolerance selecting method at least once, and the selecting method comprises: writing data to the plurality of data blocks; reading written data of the plurality of data blocks as read data; comparing the read data and the write data of each data column in the plurality of data blocks, and calculating a number of error bits in each chunk accordingly; selecting a column with a largest number of error bits in a chunk with a largest number of error bits as a bad data column; calculating a difference value between the number of error bits in the chunk and a first threshold value to store the difference value in an error tolerance list; and selecting a largest difference value in the error tolerance list as an error tolerance and acquiring a number of bad data columns corresponding to the largest difference value; wherein, the first threshold value is a number of correctable error bits of error correction code in the data storage device; wherein, the second threshold value is a total number of recordable bad data columns in the data storage device.

The present invention provides a data storage device comprises a data storage medium and a control unit connected to the data storage medium. The data storage medium comprises a plurality of data blocks, wherein each block comprises a plurality of data columns, and the plurality of data columns are divided into a plurality of chunks. The control unit is configured to execute an error tolerance selecting method. The selecting method comprises: writing data to a plurality of data blocks; reading written data of the plurality of data blocks as read data; comparing the read data and the write data of each data column in the plurality of data blocks, and calculating a number of error bits in each chunk; selecting a column with a largest number of error bits in a chunk with a largest number of error bits as a bad data column; calculating a difference value between the number of error bits in the chunk and a first threshold value to store the difference value in an error tolerance list; and selecting a largest difference value in the error tolerance list as an error tolerance and acquiring the number of bad data columns corresponding to the largest difference value; wherein, the first threshold value is a number of correctable error bits of error correction code in the data storage device; wherein, the second threshold value is a total number of recordable bad data columns in the data storage device.

In one embodiment of the present invention, each of the plurality of chunks comprises a data area and a spare area.

In one embodiment of the present invention, each of the plurality of data blocks comprises a plurality of data pages, each of the plurality of data pages comprises a plurality of data columns which are in the same row.

In one embodiment of the present invention, each of the plurality of data pages comprises a data area and a spare area, and the plurality of chunks are in the data area.

In one embodiment of the present invention, the first threshold value and the number of the bad data columns are negative correlation.

In one embodiment of the present invention, the error tolerance list further stores the number of bad data columns, the number of error bits of the chunk and the first threshold value.

The present invention, which provides a data storage device and an error tolerance method thereof, can find a balance between the number of bad data columns and the error correction ability of error correction code, so as to find out the number of bad data columns under the maximum error correction ability of error correction code, and avoid the correctable correction ability of error correction code being greatly reduced in the same time.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

Figure 1:
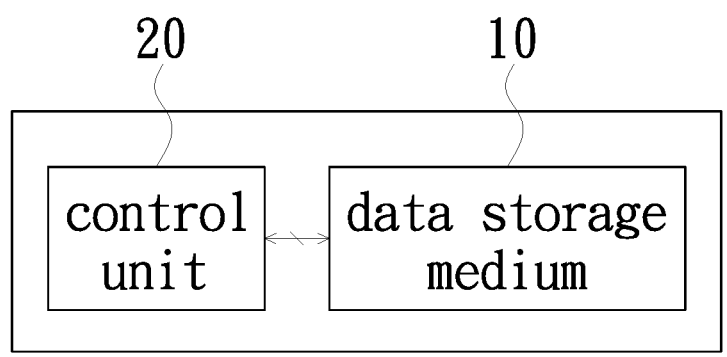
FIG. 1 is a schematic diagram of a data storage device provided by an embodiment of the present invention.

As shown in FIG. 1, FIG. 1 is a schematic diagram of a data storage device provided by an embodiment of the present invention. The data storage device 1 comprises a data storage medium 10 and a control unit 20, and the control unit 20 is connected to the data storage medium 10, in order to access data in the data storage medium 10.

Figure 2:
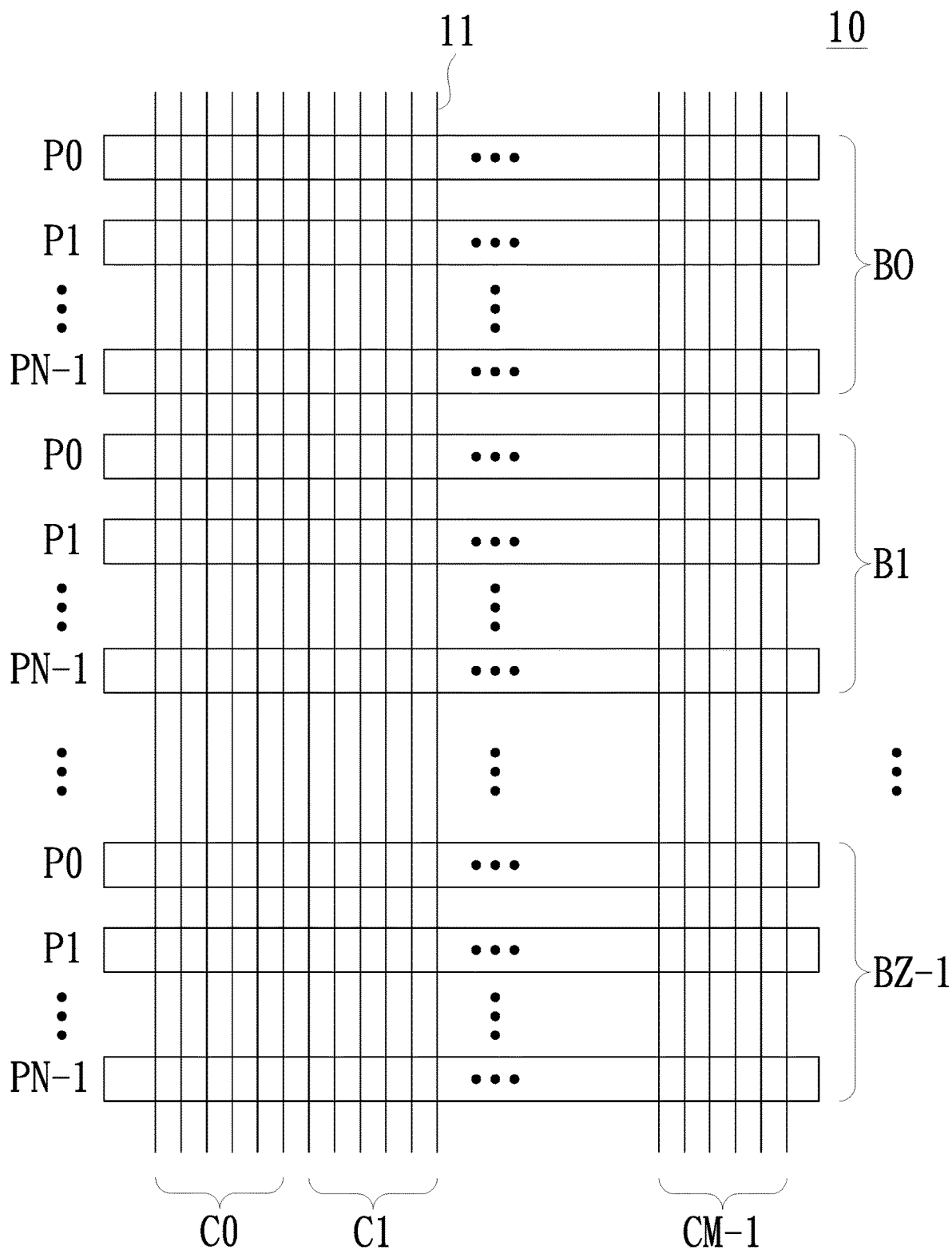
FIG. 2 is a schematic diagram of a data storage medium provided by an embodiment of the present invention.

As shown in FIG. 2, FIG. 2 is a schematic diagram of a data storage medium provided by an embodiment of the present invention. The data storage medium 10 comprises a plurality of data blocks (as shown in the labels B0 to BZ-1). Each data block comprises a plurality of data columns 11, and the data columns placed in the same row is called a data page (as shown in the labels PO to PZ-1). Further, according to the demand of a user, the data columns 11 are divided into M chunks (as shown in the labels C0 to CM-1), and each chunk C0 to CM-1 comprises a plurality of data columns 11. Z, N, and M in the above are all positive integers. In this embodiment, the data storage medium 10 is implemented by non-volatile memory, for example, by a memory device with long-term data storage such as Flash memory, Magnetoresistive RAM, Ferroelectric RAM, etc. Moreover, in an embodiment, each data page can be divided into a data area and a spare area, and the M chunks are in the data area. In the other embodiment, each chunk C0 to CM-1 can be divided into a data area and a spare area. The data area is configured to store data (or user data), the spare area is configured to store parity codes, and the parity codes are configured to correct error bits of data in the data area.

Since the bad data columns exists in the data storage medium 10, before the data storage medium 10 is divided into the data area and the spare area, the selecting method for error tolerance of the present invention can be configured to effectively determine and record the bad data columns of the data storage medium 10. After the locations of the bad data columns are determined, then the data area and the spare area are divided. In addition, the divisions of the data area and the spare area are based on a logical division of data management. Therefore, the user can also divide the data area and the spare area in the beginning, and then use the selecting method for the error tolerance of the present invention in order to determine and record the locations of the bad data columns. Finally, the divisions of the data area and the spare area are adjusted. The spirits of the above two data division methods are similar, and the order of execution steps is slightly different, in order to simplify the description of the present invention, only the second embodiment is used for description, but it is not limited thereto.

The next thing to explain is, the error tolerance selecting method of the present invention (Hereinafter referred to as the selecting method), may be configured to select the bad data columns in the data storage medium 10. Moreover, in this embodiment, one of the data blocks B0 to BZ-1 in the data storage medium 10 is randomly selected, as a sample block to perform the selecting method, and not all data blocks B0 to BZ-1 are used. It should be noted that the skilled in the art can select different number of sample blocks according to the capacity of the data storage medium 10 to perform the selecting method, for example, sixteen sample blocks are selected to perform the selecting method. Therefore, the present invention does not limit the number of sample blocks. In the other embodiment, the present invention can also perform the selecting method for all data blocks B0 to BZ-1.

Figure 3:
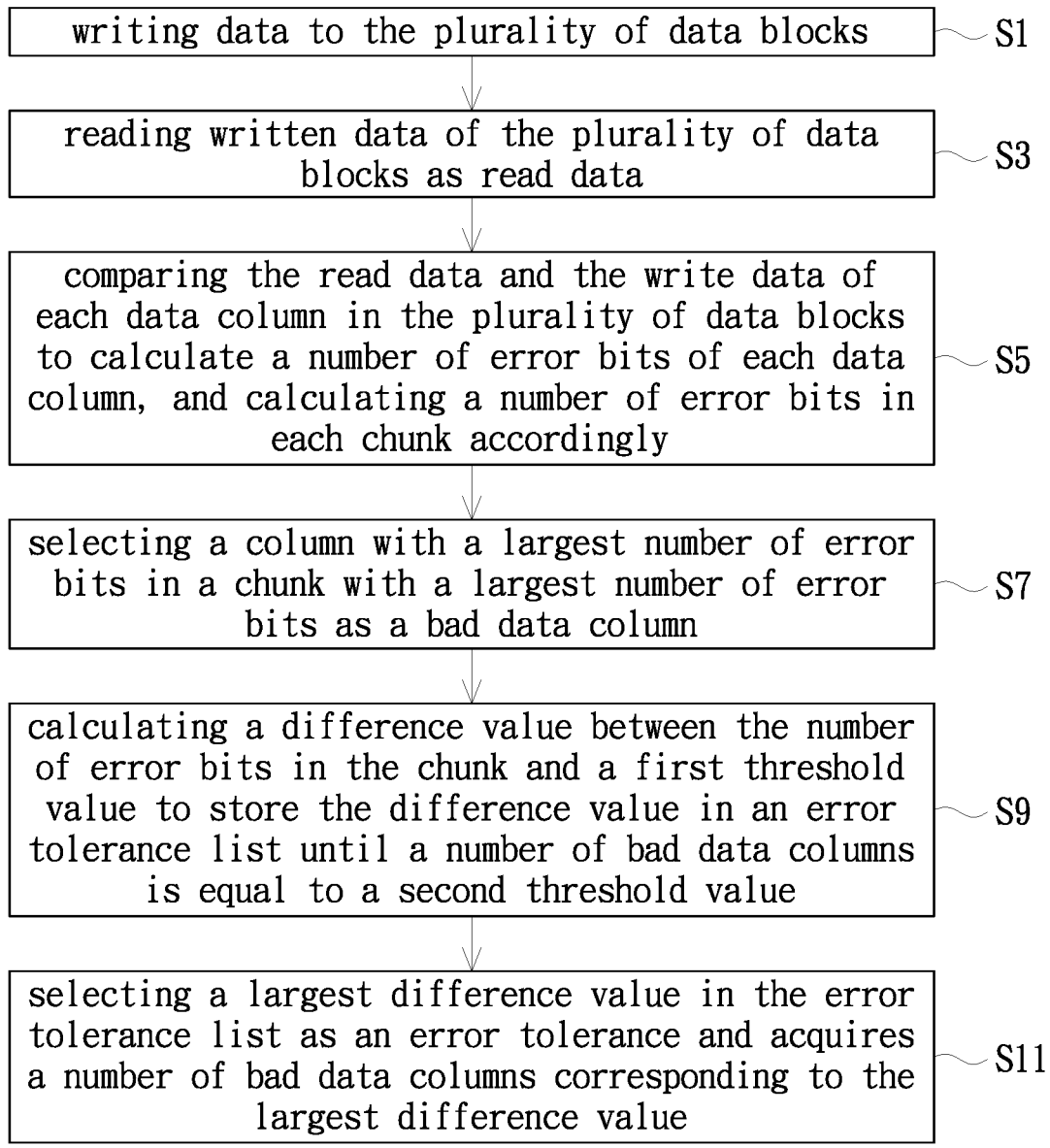
FIG. 3 is a flowchart schematic diagram of an error tolerance selecting method for a data storage device provided by an embodiment of the present invention.

As shown in FIG. 3, FIG. 3 is a flowchart schematic diagram of an error tolerance selecting method for a data storage device provided by an embodiment of the present invention. The control unit 20 executes the error tolerance selecting method of the present invention including the following steps. In step S1, the control unit 20 writes data to a plurality of data blocks. In step S3, the control unit 20 reads written data of the plurality of data blocks as read data. In step S5, the control unit 20 compares the read data and the write data of each data column in the plurality of data blocks, and calculating a number of error bits in each chunk accordingly. In step S7, the control unit 20 selects a column with a largest number of error bits in a chunk with a largest number of error bits as a bad data column. In step S9, the control unit 20 calculates a difference value between the number of error bits in the chunk and a first threshold value to store the difference value in an error tolerance list until a number of bad data columns is equal to a second threshold device, wherein the first threshold value is a number of correctable error bits of error correction code in the data storage device, the second threshold value is a total number of recordable bad data columns in the data storage device. In step S11, the control unit 20 selects a largest difference value in the error tolerance list as an error tolerance and acquires a number of bad data columns corresponding to the largest difference value.

In an embodiment, the data storage medium 10 includes 17,472 data columns 11, each data column includes 2,560 bits, these data columns are divided into sixteen chunks, each chunk includes 1024 data columns 11, and the spare area includes 17,472−(16*1,024)=1,088 data column 11. That is, each chunk can be allocated to sixty eight data columns 11, so that the error correction code corresponding to the data columns 11 of the spare area provides an ability of 36-bits correction capability for correcting error. The numerical value in this embodiment will change as the capacity of the data storage medium 10, and the present invention is not limited to the above numerical value.

First, the control unit 20 selects a data block (for example, a data block B0) as a sample block and writes data to the sample block, reads written data of the sample block as read data, compares the read data and the written data of each data column 11 in the sample block to calculate the number of error bits of each data column 11 and the number of error bits of each chunk in the sample block accordingly in the same time. For example, the data storage medium 10 includes ten data blocks, each data column 11 of each data block can be allocated 2,560/10=256 bits, and the control unit 20 compares the written data and the read data of each data column 11 including 256 bits to calculate the number of error bits of each data column 11 including 256 bits, and the total number of error bits of each chunk including 1,024 data columns 11.

Then, the control unit 20 selects a chunk with a largest number of error bits (for example, the chunk C0 in the data block B0 has a largest number of error bits which is forty seven error bits), and finds out the chunk C0 has a first data column 11 with a largest number of error bits (for example, one of data columns has eight error bits with the largest number of error bits) and records the first data column 11 as a bad data column in a bad data column table of the data storage device 1. It should be noted that the total number of the bad data columns recorded in the bad data column table is an upper limit value, which is the second threshold value, which has 1,088 data columns of the spare area in this embodiment, meanwhile the number of correctable error bits of error correction code in the data storage device 1 is the first threshold value, which represents negative correlation with the number of the bad data columns. That is to say, with the number of the bad data columns recorded in the bad data column table increasing, the first threshold value will gradually decrease, as shown in the error tolerance list of Table 1.

TABLE 1

| a number of bad data columns | first threshold value | a number of error bits in the chunk with the largest number of error bits | difference value |
|---|---|---|---|
| 0 | 36 bits | (chunk C0)47 bits | −11 |
| 1 | 35 bits | (chunk C0)39 bits | −4 |
| 2 | 35 bits | (chunk C1)33 bits | 2 |
| 3 | 35 bits | (chunk C1)29 bits | 6 |
| 4 | 34 bits | (chunk C4)28 bits | 6 |
| 5 | 34 bits | (chunk C5)26 bits | 8 |
| 6 | 34 bits | (chunk C10)18 bits | 16 |
| 7 | 32 bits | (chunk C0)17 bits | 15 |
| . | . | . | . |
| . | . | . | . |
| . | . | . | . |
| 200 | 10 bits | (chunk C5)9 bits | 1 |
| . | . | . | . |
| . | . | . | . |
| . | . | . | . |
| 1088 | 0 bits | (chunk C6)7 bits | −7 |

Then, after recording the first data column 11 of chunk C0 as the bad data column in the bad data column table, the control unit 20 finds out the chunk with a largest number of error bits from all chunk and a second data column 11 with a largest number of error bits in the chunk again (for example, chunk C0 has the largest number of error bits which is thirty seven error bits, and one of the data columns in the chunk C0 has a largest number of error bits which is ten error bits) and records the second data column 11 as a bad data column in the bad data column table. Then, after recording the second data column 11 in chunk C0 as the bad data column in the bad data column table, the control unit 20 finds out the chunk with a largest number of error bits from all chunk and a third data column 11 with a largest number of error bits in the chunk again (for example, chunk C1 has the largest number of error bits which is thirty three error bits, and one of the data columns in the chunk C1 has the largest number of error bits which is four error bits) and records the third data column 11 as a bad data column in the bad data column table. And so on, until the number of 1,088 recordable bad data columns in the data storage device 1 is used up.

Finally, the control unit 20 may calculate a difference value between the chunk with the largest number of error bits and the first threshold value to store the difference value in the error tolerance list until the number of the bad data columns is equal to the second threshold value which is 1088 data columns. And the control unit 20 selects the difference value with the largest positive integer as a best error tolerance, such as the value sixteen in the difference value column of the error tolerance list. In other words, an additional 16-bit correction capability can be obtained through the selecting method of the present invention. Meanwhile, the number of bad data columns which is six can be found corresponding, and the available data columns in the spare area is 1,088−6=1,082 data columns.

In summary, the present invention, which provides a data storage device and an error tolerance method thereof, can find a balance between the number of the bad data columns and the error correction ability of error correction code, so as to find out the number of bad data columns and the maximum error correction capability of the error correction code, and avoid the error correction ability of the error correction code being greatly reduced.

Although the present invention has been disclosed as above with the embodiments, it is not intended to limit the present invention. The ordinary skilled in the art may make some modifications and retouching without departing from the spirit and scope of the present invention. Therefore, the protection scope of the present invention shall be determined by the scope of the attached claims.

What is claimed is:

1. An error tolerance selecting method, applied to a data storage device, wherein the data storage device comprises a control unit and a data storage medium, and the data storage medium comprises a plurality of data blocks, each data block comprises a plurality of data columns, and the plurality of data columns are divided into a plurality of chunks, the control unit is configured to execute the error tolerance selecting method at least once, and the selecting method comprising:
   writing data to the plurality of data blocks;
   reading written data of the plurality of data blocks as read data;
   comparing the read data and the write data of each data column in the plurality of data blocks, and calculating a number of error bits in each chunk accordingly;
   selecting a column with a largest number of error bits in a chunk with a largest number of error bits as a bad data column;
   calculating a difference value between the number of error bits in the chunk and a first threshold value to store the difference value in an error tolerance list until a number of bad data columns is equal to a second threshold value; and
   selecting a largest difference value in the error tolerance list as the error tolerance and acquiring a number of the bad data columns corresponding to the largest difference value;
   wherein, the first threshold value is a number of correctable error bits of error correction code in the data storage device;
   wherein, the second threshold value is a total number of recordable bad data columns in the data storage device.

2. The error tolerance selecting method as claimed in claim 1, wherein each of the plurality of chunks comprises a data area and a spare area.

3. The error tolerance selecting method as claimed in claim 1, wherein each of the plurality of data blocks comprises a plurality of data pages, each of the plurality of data pages comprises a plurality of data columns which are in a same row.

4. The error tolerance selecting method as claimed in claim 3, wherein each of the plurality of data pages comprises a data area and a spare area, and the plurality of chunks are in the data area.

5. The error tolerance selecting method as claimed in claim 1, wherein the first threshold value and the number of the bad data columns are negative correlation.

6. The error tolerance selecting method as claimed in claim 5, wherein the error tolerance list further stores the number of the bad data columns, the number of error bits of the chunk and the first threshold value.

7. A data storage device, comprising:
   a data storage medium, comprising a plurality of data blocks, wherein each of the plurality of data blocks comprises a plurality of data columns, and the plurality of data columns are divided into a plurality of chunks; and
   a control unit, connected to the data storage medium, and configured to execute an error tolerance selecting method, the selecting method includes:
   writing data to the plurality of data blocks;

reading written data of the plurality of data block as read data;

comparing the read data and the write data of each data column in the plurality of data blocks, and calculating a number of error bits in each chunk accordingly;

selecting a column with a largest number of error bits in a chunk with a largest number of error bits as a bad data column;

calculating a difference value between the number of error bits in the chunk and a first threshold value to store the difference value in an error tolerance list until a number of bad data columns is equal to a second threshold value; and selecting a largest difference value in the error tolerance list as the error tolerance and acquiring a number of bad data columns corresponding to the largest difference value;

wherein, the first threshold value is a number of correctable error bits of error correction code in the data storage device;

wherein, the second threshold value is a total number of recordable bad data columns in the data storage device.

8. The data storage device as claimed in claim 7, wherein each of the plurality of chunks comprises a data area and a spare area.

9. The data storage device as claimed in claim 7, wherein each of the plurality of data blocks comprises a plurality of data pages, each of the plurality of data pages comprises a plurality of data columns which are in a same row.

10. The data storage device as claimed in claim 9, wherein each of the plurality of data pages comprises a data area and a spare area, and the plurality of chunks are in the data area.

11. The data storage device as claimed in claim 7, wherein the first threshold value and the number of the bad data columns are negative correlation.

12. The data storage device as claimed in claim 11, wherein the error tolerance list further stores the number of bad data columns, the number of error bits of the chunk and the first threshold value.

* * * * *